(12) United States Patent
Nobu

(10) Patent No.: US 7,201,684 B2
(45) Date of Patent: Apr. 10, 2007

(54) SPEED-CHANGING HYDRAULIC PRESSURE CONTROL SYSTEM FOR BELT-TYPE CONTINUOUSLY VARIABLE TRANSMISSION

(75) Inventor: Hisao Nobu, Kanagawa (JP)

(73) Assignee: Jatco Ltd, Fuji-shi (JP)

( * ) Notice: Subject to any disclaimer, the term of this patent is extended or adjusted under 35 U.S.C. 154(b) by 439 days.

(21) Appl. No.: 10/670,270

(22) Filed: Sep. 26, 2003

(65) Prior Publication Data

US 2004/0176198 A1    Sep. 9, 2004

(30) Foreign Application Priority Data

Sep. 30, 2002   (JP)   ............... 2002-285498

(51) Int. Cl.
*F16H 61/06*   (2006.01)
(52) U.S. Cl. .................................... 474/28
(58) Field of Classification Search ............... 474/18, 474/28; 477/45–49
See application file for complete search history.

(56) References Cited

U.S. PATENT DOCUMENTS

| 4,685,357 | A | * | 8/1987 | Sawada et al. | 477/48 |
| 4,702,725 | A | * | 10/1987 | Kouno et al. | 474/18 |
| 5,243,881 | A | * | 9/1993 | Hayashi | 477/45 |
| 6,464,603 | B1 | * | 10/2002 | Reuschel et al. | 474/28 |
| 6,612,958 | B2 | * | 9/2003 | Imai et al. | 475/210 |

FOREIGN PATENT DOCUMENTS

WO   WO 99/32806 A1 *   7/1999
WO   WO 00/65253 A1 *   11/2000

OTHER PUBLICATIONS

U.S. Appl. No. 10/674,069, filed Sep. 30, 2003, Sawada et al.
U.S. Appl. No. 10/664,031, filed Sep. 17, 2003, Yamamoto et al.
U.S. Appl. No. 10/674,091, filed Sep. 30, 2003, Jozaki et al.
U.S. Appl. No. 10/670,271, filed Sep. 26, 2003, Nobu.
U.S. Appl. No. 10/662,442, filed Sep. 16, 2003, Ochiai et al.
U.S. Appl. No. 10/670,223, filed Sep. 26, 2003, Wakayama.
U.S. Appl. No. 10/673,549, filed Sep. 30, 2003, Sawada et al.
U.S. Appl. No. 10/670,775, filed Sep. 26, 2003, Shimanaka et al.
U.S. Appl. No. 10/770,549, filed Feb. 4, 2004, Katou.

* cited by examiner

Primary Examiner—Marcus Charles
(74) Attorney, Agent, or Firm—Foley & Lardner LLP

(57) ABSTRACT

A belt-type continuously variable transmission having a forward clutch is incorporated with a speed-changing hydraulic pressure control system. The control system includes an engaging pressure regulating device for outputting an engaging pressure for the forward clutch. An electronically controlled hydraulic pressure control valve is provided to output a signal pressure which is able to cause the engaging pressure regulating device to set the engaging pressure. A control unit is provided to output a control command signal to the hydraulic pressure control valve, the control command signal causing the hydraulic pressure control valve to output the signal pressure. Here, the engaging pressure regulating device is arranged to output a minimum value of the engaging pressure in response to a maximum value of the signal pressure from the hydraulic pressure control valve, and to output a maximum value of the engaging pressure in response to a minimum value of the signal pressure.

2 Claims, 4 Drawing Sheets

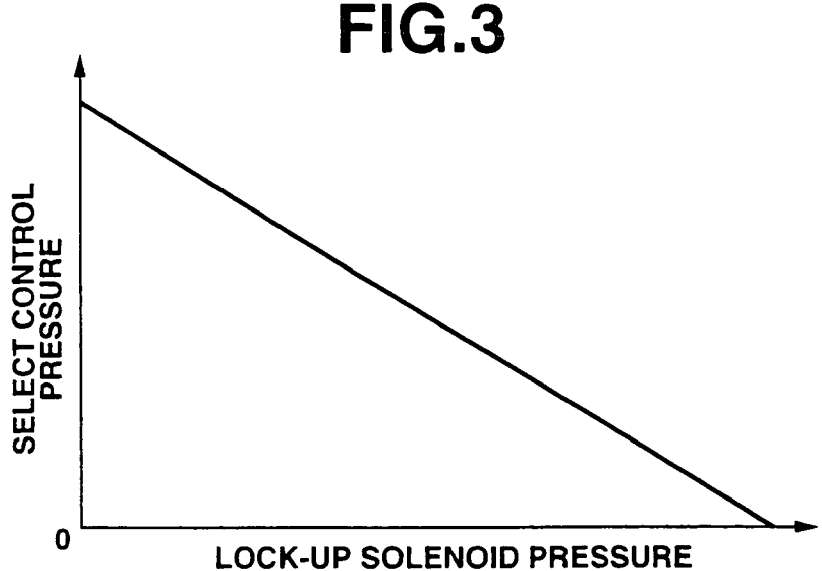
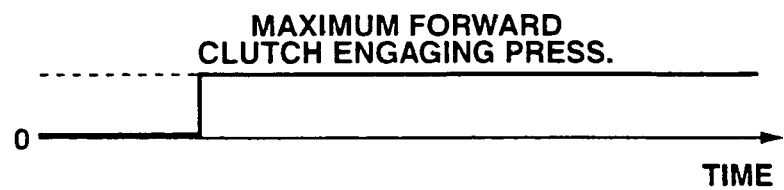
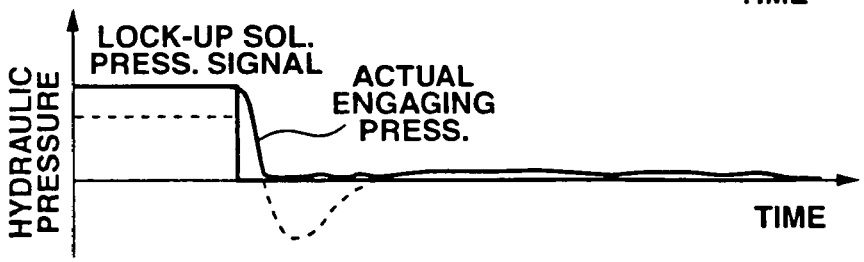
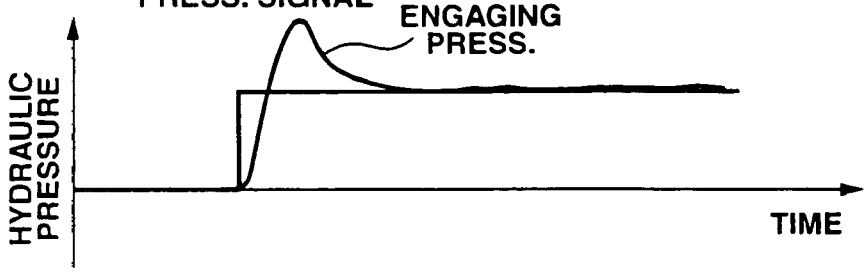

(EARLIER TECHNOLOGY)

(EARLIER TECHNOLOGY)

SPEED-CHANGING HYDRAULIC PRESSURE CONTROL SYSTEM FOR BELT-TYPE CONTINUOUSLY VARIABLE TRANSMISSION

BACKGROUND OF THE INVENTION

This invention relates to improvements in a speed-changing hydraulic pressure control system for a belt-type continuously variable transmission, by which hydraulic for speed-changing of the belt-type continuously variable transmission is effectively controlled without occurring slip of a belt.

A variety of speed-changing hydraulic pressure control systems for a belt-type continuously variable transmission have been proposed. One of them will be briefly discussed with reference to FIG. 6 and includes a pressure regulating valve 230 which is supplied with a hydraulic pressure supplied from a line pressure supply valve 200 and a hydraulic pressure (signal pressure) supplied from an electrically controlled hydraulic pressure control valve 210. The line pressure supply valve 200 is adapted to supply the regulated hydraulic pressure. Additionally, the pressure regulating valve 230 is hydraulically connected to a forward clutch 220. When the signal pressure is output from the electronically controlled hydraulic pressure control valve 210, an engaging pressure of the forward clutch 220 is regulated in a manner to balance with a resultant force of the biasing force of a return spring 232 of the pressure regulating valve 230 and the signal pressure, as shown in FIG. 6. Here, the output pressure of the pressure regulating valve 230 increases in proportion to an increase of the output pressure of the electronically controlled hydraulic pressure control valve 210.

SUMMARY OF THE INVENTION

Generally in the belt-type continuously variable transmission, if a belt makes its slip between primary and secondary pulleys, the durability of the belt lowers. Accordingly, in order to prevent the belt from slipping, the engaging pressure of the forward clutch 220 is set lower than pulley clamp pressures at which the belt is clamped in pulley grooves of pulleys. As a result, when a large torque is input through the forward clutch 220, the forward clutch 220 makes a slip thereby preventing the belt from slipping.

However, in the above earlier technology, in the event that fail is occurs in the electronically controlled hydraulic pressure control valve 210 so that the hydraulic pressure output from the control valve 210 unavoidably rises, the hydraulic pressure to be supplied to the forward clutch 220 unavoidably rises with the rise of the hydraulic pressure from the control valve 210 as seen from FIG. 5. At this time, the engaging pressure of the forward clutch 220 becomes too high. Consequently, particularly in a low vehicle speed operating condition, a large torque is input to the primary pulley, and therefore a transmission-possible torque capacity of the forward clutch becomes larger than a transmission-possible torque capacity of the belt. Additionally, in case that the electronically controlled hydraulic pressure control valve 210 is suddenly operated, a surge pressure is generated as shown in FIG. 4C though it is not intended, thereby degrading a controllability for the transmission.

It is, therefore, an object of the present invention to provide an improved speed-changing hydraulic pressure control system for a belt-type continuously variable transmission, which can effectively overcome drawbacks encountered in conventional and earlier technique speed-changing hydraulic pressure control systems of a belt-type continuously variable transmission.

Another object of the present invention is to provide an improved speed-changing hydraulic pressure control system of a belt-type continuously variable transmission, by which a belt can be prevented from making its slip in a belt and pulley assembly even in the event that an electronically controlled hydraulic pressure control valve makes its fail, while achieving an improved controllability of the transmission.

Another object of the present invention is to provide an improved speed-changing hydraulic pressure control system of a belt-type continuously variable transmission, by which a transmission-possible torque capacity of a forward clutch cannot exceed a transmission-possible torque capacity of a belt even if an electronically controlled hydraulic pressure control valve makes its fail.

A further object of the present invention is to provide an improved speed-changing hydraulic pressure control system of a belt-type continuously variable transmission, by which an engaging pressure of a forward clutch can be prevented from becoming excessively high even if an electronically controlled hydraulic pressure control valve such as a lock-up solenoid valve continues to output the maximum value of a pressure signal.

According to the present invention, a speed-changing hydraulic pressure control system is for a belt-type continuously variable transmission including a forward clutch. The control system comprises an engaging pressure regulating device hydraulically connected to the forward clutch to output an engaging pressure for the forward clutch. An electronically controlled hydraulic pressure control valve is hydraulically connected to the engaging pressure regulating device to output a signal pressure which is able to cause the engaging pressure regulating device to set the engaging pressure. Additionally, a control unit is electronically connected to the electronically controlled hydraulic pressure control valve to output a control command signal to the electronically controlled hydraulic control valve, the control command signal causing the electronically controlled hydraulic pressure control valve to output the signal pressure. In the control system, the engaging pressure regulating device is arranged to output a minimum value of the engaging pressure in response to a maximum value of the signal pressure output from the electrically controlled hydraulic pressure control valve, and to output a maximum value of the engaging pressure in response to a minimum value of the signal pressure output from the electrically controlled hydraulic pressure control valve.

BRIEF DESCRIPTION OF THE DRAWINGS

FIG. 3 is a graph showing the relationship between a lock-up solenoid pressure at a lock-up solenoid valve and a select control pressure at a select control valve, in the hydraulic circuit of FIG. 2;

FIGS. 4A to 4C are time charts at a time when a command signal for causing the engaging pressure of a forward clutch to take the maximum value is output, in which FIG. 4A is a time chart showing the output of the command signal; FIG. 4B is a time chart showing the relationship between the pressure signal output from the lock-up solenoid valve and the actual engaging pressure of the forward clutch in the present invention; and FIG. 4C is a time chart showing the relationship between the pressure signal output from the lock-up solenoid valve and the actual engaging pressure of the forward clutch in the earlier technology.

DETAILED DESCRIPTION OF THE INVENTION

Figure 1:
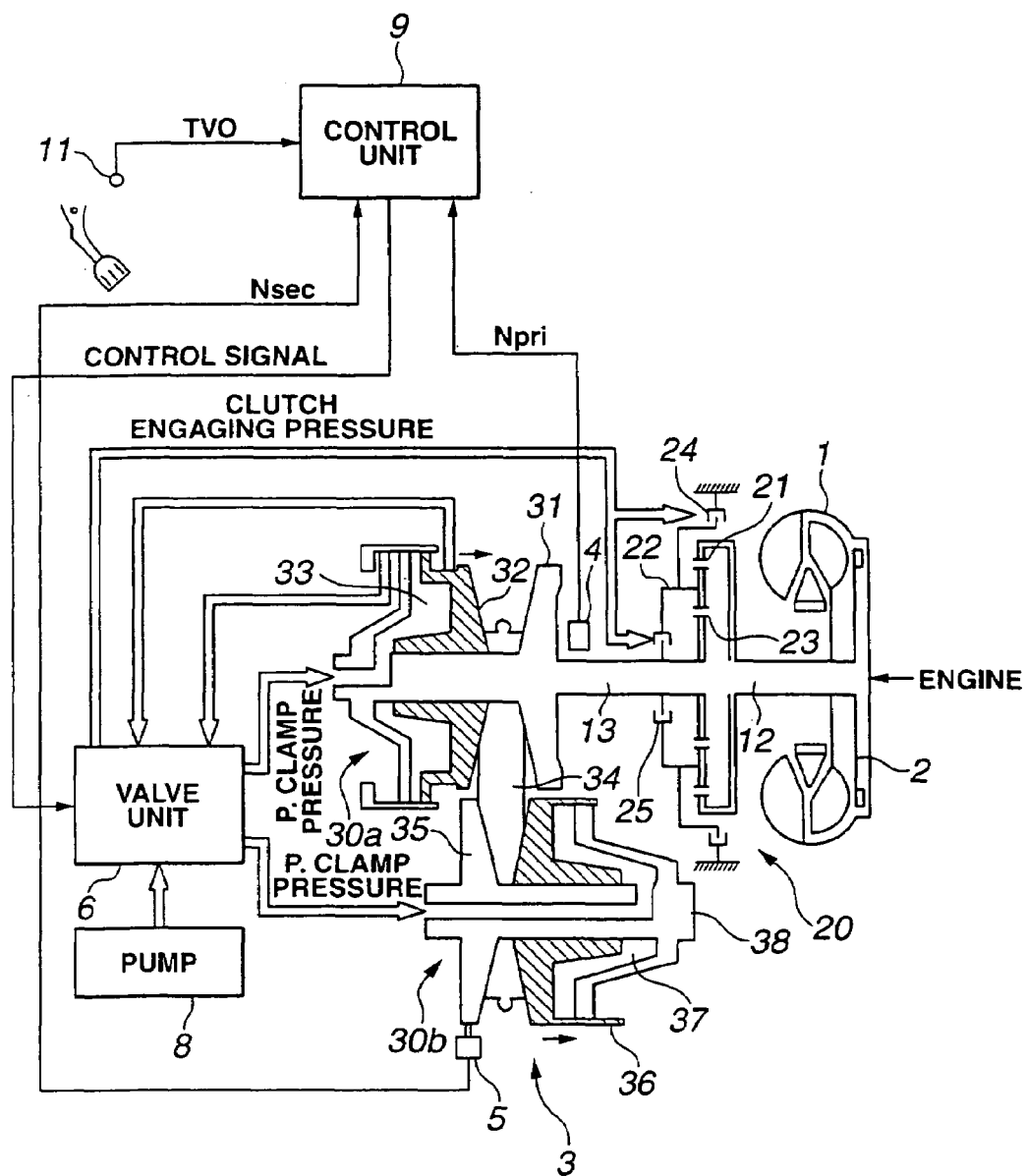
FIG. 1 is a schematic illustration of a belt-type continuously variable transmission with a speed-changing hydraulic pressure control system, incorporated with an embodiment of a speed-changing hydraulic pressure control system according to the present invention.

Referring now to FIG. 1, an embodiment of a speed-changing oil pressure control system for a belt-type continuously variable transmission (referred to as CVT) is illustrated as being incorporated with an engine (not shown) of a motor vehicle such as an automotive vehicle. The engine includes an power output shaft (not shown) to which a torque converter 1 is driveably connected. The power output of the engine is transmitted through the torque converter 1 to a power input shaft 12. The torque converter 1 includes a lock-up clutch 2 for directly connecting the power output shaft of the engine to the power input shaft 12. The power input shaft 12 is connected through a forward and reverse changing mechanism 20 to a belt and pulley assembly 3. The forward and reverse changing mechanism 20 is constituted of a planetary gear mechanism which includes a ring gear 21 connected to the power input shaft 12. In other words, the ring gear 21 is connected to the power output side of the torque converter 1. The planetary gear mechanism further includes pinions (no numeral) disposed between the ring gear 21 and a sun gear 23. The sun gear 23 is connected to a transmission input shaft 13. The pinions are carried by a pinion carrier 22. The pinion carrier 22 is provided with a reverse brake 24 which can fix the pinion carrier 22 to a casing (no numeral) of the transmission, and a forward clutch 25 which can connecting the transmission input shaft 13 with the pinion carrier 22 as a one-piece member.

The belt and pulley assembly 3 includes a primary pulley 30a which is provided to an end section of the transmission input shaft 13. The primary pulley 30a is connected through a belt 34 to a secondary pulley 30b so that a rotational force of the primary pulley 30a is transmitted to the secondary pulley 30b. The primary pulley 30a includes a stationary frustoconical plate 31 and a movable frustoconical plate 32 which axially face to each other to form a V-shaped (in cross-section) pulley groove in which the belt 34 is disposed. The stationary frustoconical plate 31 is fixedly mounted on the transmission input shaft 13. The movable frustoconical plate 32 is axially movably mounted on the transmission input shaft 13 to define a primary pulley cylinder chamber 33 which is supplied with a hydraulic fluid, so that the movable frustoconical plate 34 is axially movable under a hydraulic pressure applied to the primary pulley cylinder chamber 33.

The secondary pulley 30b is provided to a follower shaft 38 and includes a stationary frustoconical plate 35 and a movable frustoconical plate 36 which axially face to other to form a V-shaped (in cross-section) pulley groove in which the belt 34 is disposed. The stationary frustoconical plate 35 is fixedly mounted on the follower shaft 38. The movable frustoconical plate 36 is axially movably mounted on the follower shaft 38 to define a secondary pulley cylinder chamber 37 which is supplied with a hydraulic fluid, so that the movable frustoconical plate 36 is axially movable under a hydraulic pressure applied to the secondary pulley cylinder chamber 37. A drive gear (not shown) is fixedly mounted on the follower shaft 38 to drive a drive shaft connected to road wheels of the vehicle, through an idler gear, an idler shaft, a pinion, a final gear and a differential, though not shown.

With the above arrangement, the rotational force from the engine is transmitted through the torque converter 1 and the forward and reverse changing mechanism 20 to the transmission input shaft 13. The rotational force of the transmission input shaft 13 is transmitted through the primary pulley 30a, the belt 34 and the secondary pulley 30b to the follower shaft 38. The rotational force of the follower shaft 38 is transmitted through the drive gear, the idler gear, the idler shaft, the pinion and the final gear to the differential.

During the above transmission of the rotational force from the engine to the differential, the movable frustoconical plate 32 of the primary pulley 30a and the movable frustoconical plate 36 of the second pulley 30b are axially moved thereby to change the width of the V-shaped pulley groove. This changes a contact location radius of the belt 34 fitted in the pulley groove formed between the stationary frustoconical plate 31, 35 and the movable frustoconical plate 32, 36. The contact location radius means a radius of a rounded part of the belt 34 in the pulley groove. As a result, a transmission ratio of the CVT or a rotational speed ratio between the primary pulley 30a and the secondary pulley 30b can be changed. Control for changing the width of the V-shaped pulley groove is accomplished by regulating the hydraulic pressure to be applied to the primary pulley cylinder chamber 33 and the secondary pulley cylinder chamber 37.

A CVT control unit 9 is supplied with a signal of a throttle opening degree TVO output from a throttle opening degree sensor 10, a signal of a primary rotational speed Npri output from a primary rotational speed sensor 4, a signal of a secondary rotational speed Nsec output from a secondary rotational speed sensor 5, signals of pulley clamp pressures output from pulley clamp pressure sensors (not shown), the above-mentioned transmission ratio, and the like. The throttle opening degree TVO is representative of an opening degree of a throttle valve or intake air amount control valve. The primary rotational speed Npri is representative of a rotational speed of the primary pulley 30a. The secondary rotational speed Nsec is representative of a rotational speed of the secondary pulley 30b. The pulley clamp pressures includes two pulley clamp pressures, in which one pulley clamp pressure is a hydraulic pressure to be applied to the primary pulley cylinder chamber 33 for the purpose of clamping the belt 34 between the stationary and movable frustoconical plates of the primary pulley 30a, and the other pulley clamp pressure is a hydraulic pressure to be applied to the secondary pulley cylinder chamber 37 for the purpose of clamping the belt 34 between the stationary and movable frustoconical plates of the secondary pulley 30b. The CVT control unit 9 is arranged to compute a control signal in accordance with the above various signals supplied thereto and output the control signal to a hydraulic control valve unit 6. The hydraulic control valve unit 6 is arranged to produce the pulley clamp pressures (control pressures) in accordance with the control signal from the CVT control unit 9 and output the pulley clamp pressures respectively to the primary pulley cylinder chamber 33 and the secondary pulley cylinder chamber 37, thereby accomplishing a speed-changing control for the vehicle.

Figure 2:
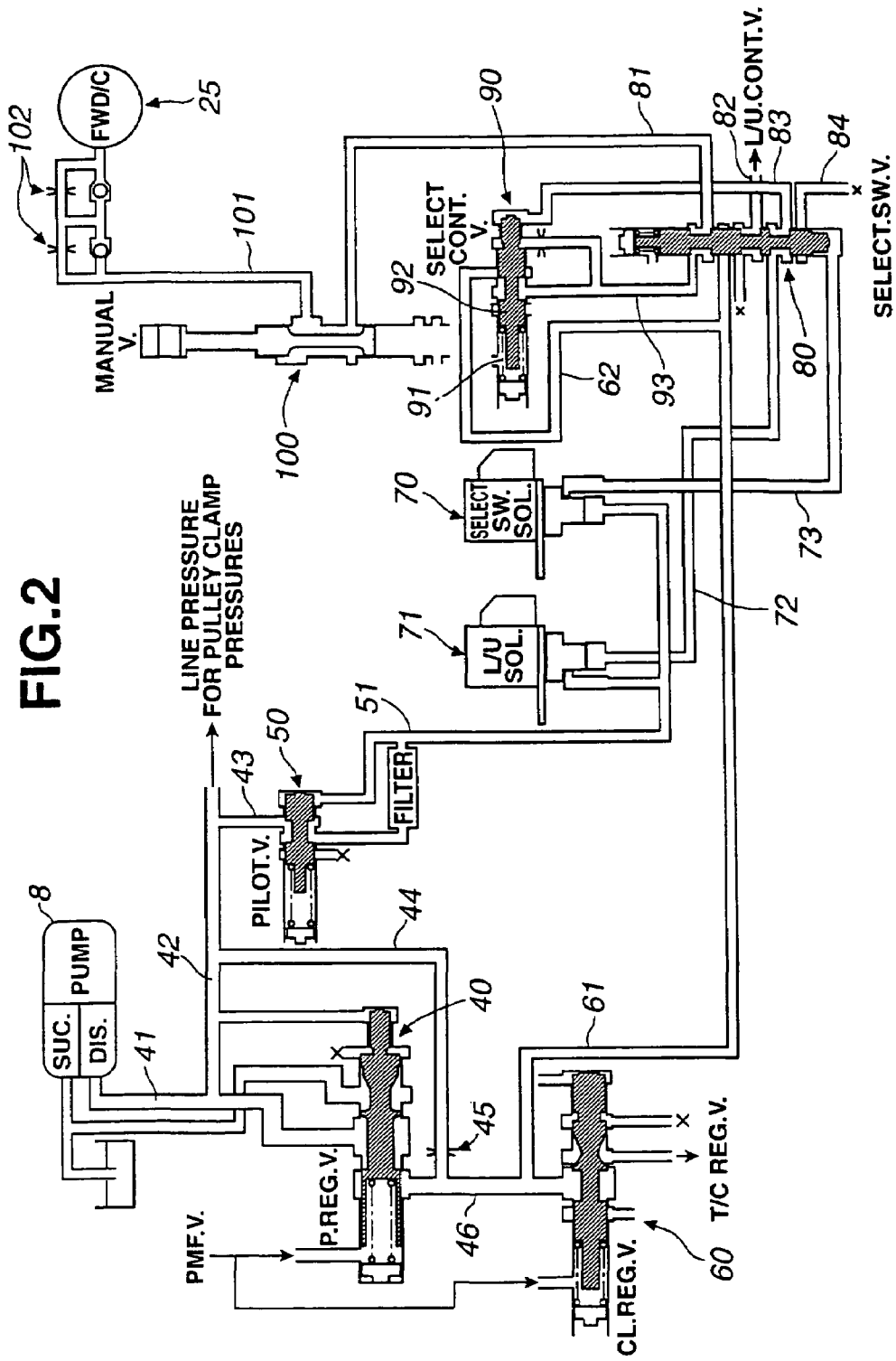
FIG. 2 is a circuit diagram of a hydraulic circuit used in the speed-changing hydraulic pressure control system of FIG. 1.
Figure 5:
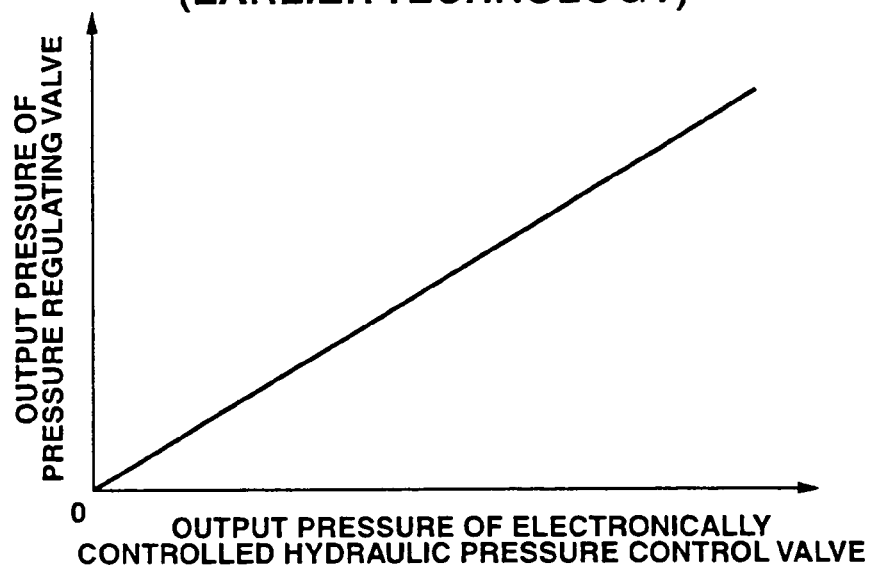
FIG. 5 is a graph showing the relationship between the output of a pressure regulating valve and the output pressure of an electrically controlled hydraulic pressure control valve, in the earlier technology.
Figure 6:
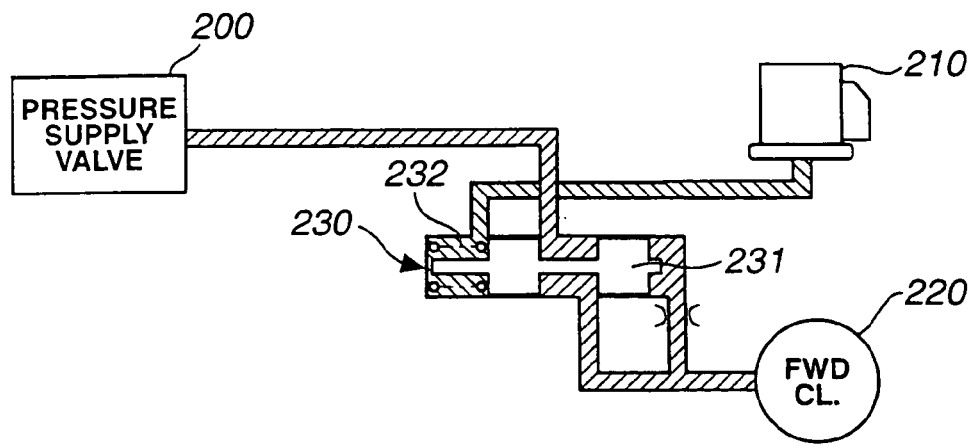
FIG. 6 is a hydraulic circuit of a speed-changing hydraulic pressure control system in the earlier technology.

Next, a hydraulic circuit for the belt and pulley assembly 3 and the forward and reverse changing mechanism 20 in the above embodiment will be discussed with reference to FIG. 2.

The hydraulic circuit includes a pressure regulator valve 40 for regulating a discharge pressure of an oil pump 8 as a line pressure (which is finally controlled to the pulley clamp pressures), supplied through a hydraulic line 41. The oil pump 8 has a suction section (identified as SUC.) through which hydraulic fluid is sucked into the oil pump 8, and a discharge section (identified as DIS.) through which hydraulic fluid is discharged from the oil pump 8. A hydraulic line 42 is connected to the hydraulic line 41. The hydraulic line 42 serves to supply the line pressure which is finally controlled to the pulley clamp pressures which are respectively to be fed to the primary pulley cylinder chamber 33 and the secondary pulley cylinder chamber 37 for the purpose of clamping the belt 34 between the stationary and movable frustoconical plates. A hydraulic line 43 is connected to the hydraulic line 42 to supply a pump pressure (from the oil pump 8) to a pilot valve 50.

The hydraulic pressure drained from the pressure regulator valve 40 is supplied through a hydraulic line 46 to a clutch regulator valve 60. Thus, the clutch regulator valve 60 is supplied with a hydraulic pressure which is regulated lower than that developed in the pressure regulator valve 40. Accordingly, a pressure supplied as an engaging pressure (forward clutch engaging pressure) for a forward clutch 25 can be prevented from becoming higher than the pulley clamp pressures. The forward clutch engaging pressure is a hydraulic pressure at which the forward clutch 25 is engaged. The clutch regulator valve 60 is connected to a torque converter regulator valve (T/C REG. V.) for regulating a hydraulic pressure to be supplied to the torque converter 1.

A hydraulic line 44 is connected to the hydraulic line 46 and provided with an orifice 45. The hydraulic line 44 is connected to the hydraulic line 42. The clutch regulator valve 60 regulates a hydraulic pressure in the hydraulic line 46 and a hydraulic pressure in a hydraulic line 61. The hydraulic pressure in the hydraulic line 61 is supplied to a select switching valve 80 and a select control valve 90.

The pilot valve 50 connected to the hydraulic line 43 is adapted to set a certain supply pressure to a lock-up solenoid (valve) 71 and a select switching solenoid (valve) 70. An output pressure from the select switching solenoid 70 is supplied through a hydraulic line 73 to a select switching valve 80 thereby controlling an operation of the select switching valve 80. An output pressure from the lock-up solenoid 71 is supplied through a hydraulic line 72 to the select switching valve 80.

The select switching valve 80 is operated by a hydraulic pressure from the select switching solenoid 70. The select switching valve 80 is provided with a first input port to which the hydraulic line 72 is connected for supplying a hydraulic pressure from the lock-up solenoid 71, a second input port to which the hydraulic line 61 is connected for supplying a hydraulic pressure regulated by the clutch regulator valve 60, and a third input port to which the hydraulic line 93 is connected for supply a pressure signal regulated by the select control valve 90. Additionally, the select switching valve 80 is provided with a first output port to which a hydraulic line 81 is connected for supplying a forward clutch pressure to a manual valve 100, a second output port to which a hydraulic line 82 is connected for supplying a hydraulic pressure to a lock-up clutch control valve (not shown), a third output port to which a hydraulic line 83 is connected for supplying a hydraulic pressure with which a spool 92 of the select control valve 90 is operated, and a fourth output port to which a drain line 84 is connected for draining a hydraulic pressure. The manual valve 100 is connected through a hydraulic line 101 to the forward clutch 25. The hydraulic line 101 is provided with orifices 102. The lock-up clutch control valve is arranged to control the lock-up clutch 2 in the torque converter 1.

The select control valve 90 is operated by the hydraulic pressure supplied from the lock-up solenoid 71 through the hydraulic line 83. The select control valve 90 is provided with an input port to which a hydraulic line 62 is connected for supplying a hydraulic pressure regulated by the clutch regulator valve 60, and another input port to which the hydraulic line 83 is connected for supplying the signal pressure from the lock-up solenoid 71. The select control valve 90 regulates the hydraulic pressure by controlling a communication condition between the hydraulic line 62 and the hydraulic line 93.

When the select switching solenoid 70 is switched ON, the signal pressure of the lock-up solenoid 71 is applied through the select switching valve 80 to the select control valve 90 as a signal pressure for the select control valve 90. The hydraulic pressure regulated by the select control valve 90 is supplied to the manual valve 100. With this arrangement, as shown in FIG. 3, a select control pressure (i.e., a forward clutch engaging pressure) at the select control valve 90 increases as a lock-up solenoid pressure (or signal pressure from the lock-up solenoid 71) lowers.

When the select switching solenoid 70 is switched OFF, the signal pressure of the lock-up solenoid 71 is supplied to the lock-up control valve (identified as L/U CONT. V.). Additionally, the hydraulic pressure regulated by the clutch regulator valve 60 is supplied to the manual valve 100 without passing through the select control valve 90.

When the select switching solenoid 70 is switched ON while the signal pressure of the lock-up solenoid 71 is in the state of zero, for example, due to fail, the signal pressure to the select control valve 90 becomes in the state of zero. At this time, a spool valve 92 of the select control valve 90 is moved rightward in the drawing under the spring load of a return spring 91. Then, the hydraulic line 62 and the hydraulic line 93 are completely brought into communication with each other, so that the maximum value of the forward clutch engaging pressure is supplied through the manual valve 100 to the forward clutch 25 when the belt and pulley assembly 3 is in a D range.

Here, operation of the select switching valve 80 and the select control valve 90 in accordance with running conditions of the vehicle will be discussed for the belt-type continuously variable transmission of the above embodiment.

At low vehicle speed conditions, the lock-up clutch 2 is put into a released condition so as to increase a torque by the torque converter 1. At this time, a large torque is input to the belt and pulley assembly 3, and therefore there is the fear of the belt 34 slipping between the primary pulley 31 and the secondary pulley 35 thereby lowering the durability of the belt 34. Accordingly, in order to prevent such slip of the belt 35, the engaging pressure for the forward clutch 25 is set lower than the pulley clamp pressures so as to cause the forward clutch 25 to make its slip when a large torque is input, thereby preventing the slip of the belt 35. As a result, when the lock-up clutch 2 is in the released condition, the forward clutch engaging pressure is regulated at a lower value under the action of the select control valve 90.

When the vehicle speed increases, the lock-up clutch 2 is put into an engaging condition, the torque from the engine is input to the belt and pulley assembly 3 without being increased. Accordingly, the select switching control valve 80 is operated to supply the signal pressure of the lock-up solenoid 71 to the lock-up control valve, while the hydraulic pressure regulated by the clutch regulator valve 60 is supplied to the forward clutch 25 as it is.

With reference to FIGS. 4A to 4C which are time charts representing the relationship between a command signal to the lock-up solenoid and the select control pressure (the engaging pressure of the forward clutch), assume that a command signal for causing the engaging pressure of the forward clutch to take the maximum value is output as shown in FIG. 4A.

In case of the speed-changing hydraulic pressure of the earlier technology, as shown in FIG. 4C, the signal pressure output from the lock-up solenoid (71) becomes the maximum, and therefore the select control pressure becomes the maximum. At this time, an actual hydraulic pressure or engaging pressure to a forward clutch (25) once rises under the effect of surge pressure or the like and then falls to a target hydraulic pressure (the maximum value). Thus, such a high hydraulic pressure is developed though it is not intended, thereby providing the fear of producing an engagement shock or the like of the forward clutch.

In contrast, in case of the speed-changing hydraulic pressure control system according to the above embodiment of the present invention, first in response to the signal pressure of zero from the lock-up solenoid 71, the select control pressure takes the maximum value. Subsequently, in response to the signal pressure of the maximum value from the lock-up solenoid 71, the select control pressure takes the minimum value. Accordingly, even if surge pressure is developed, it is impossible that the hydraulic pressure below zero is developed. This can provide stable engaging pressure to the forward clutch 25.

Additionally, assumes that the lock-up solenoid 71 makes its fail so that the signal pressure output from the lock-up solenoid 71 continues to take the maximum value. In case of the speed-changing hydraulic pressure control system of the earlier technology, the engaging pressure of the forward clutch (25) unlimitedly increases, and therefore the engaging force of the forward clutch 2 becomes too high thereby providing the fear of the belt 34 making its slip as discussed above. However, in case of the speed-changing hydraulic pressure control system according to this embodiment of the present invention, even if the lock-up solenoid 71 makes its fail to continue to output the signal pressure at the maximum value, the select control pressure becomes zero. As a result, the engaging pressure of the forward clutch 25 can be prevented from becoming excessively high, thereby securely avoiding the slip of the belt 34.

As discussed above, in the speed-changing hydraulic pressure control system according to the embodiment of the present invention, when the maximum value of the signal pressure is output from the lock-up solenoid 71, the minimum value of the engaging pressure is supplied to the forward clutch 25. When the minimum value of the signal pressure is output from the lock-up solenoid 71, the maximum value of the engaging pressure is supplied to the forward clutch 25. Accordingly, even if the lock-up solenoid makes its fail to continue to output the maximum value of the signal pressure, the output pressure of the select control valve 90 becomes zero, and therefore the engaging pressure of the forward clutch can be prevented from becoming excessively high thereby securely avoiding the slip of the belt 34. Additionally, even if surge pressure is developed, a hydraulic pressure of not higher than zero cannot be developed, thereby providing a stable hydraulic pressure.

Further, the select control valve 90 is set to output the maximum value of the output pressure which value is less than a transmission-possible torque capacity for a belt 34. The transmission-possible torque means the maximum value of a torque capacity which makes it possible that the belt 34 can transmit a rotational force without slip of the belt. Accordingly, even if the lock-up solenoid 71 continues to output the signal pressure of zero, the belt 34 can be prevented from its slip because of the fact that the maximum value of the output pressure of the select control valve 90 is less than the belt transmission-possible torque.

Furthermore, when the lock-up clutch 2 is engaged, the select switching solenoid 80 establishes a communication between the lock-up solenoid 71 and the lock-up control valve (not shown). When the lock-up clutch 2 is released or disengaged, the select switching solenoid 80 established a communication between the lock-up solenoid 71 and the select control valve 90. With this, when the forward clutch 25 is required to be engaged under control while the lock-up clutch 2 is not required to be engaged, for example, during a low vehicle speed cruising condition or the like, the forward clutch 25 is engaged under control by using the lock-up solenoid valve 71. When the forward clutch 2 is not required to be engaged under control, for example, during a cruising condition at a vehicle speed higher than a certain level, the lock-up clutch 2 is engaged under control. Thus, the engaging control of the forward clutch 2 can be accomplished by using the existing actuator(s), and therefore it is unnecessary to add a new arrangement and add a significant design modification to the hydraulic control valve unit and the like, thus avoiding a cost-up for the speed-changing hydraulic pressure control system.

While only one embodiment of the speed-changing hydraulic pressure control system according to the present invention has been shown and described, it will be understood that the principle of the present invention may be applied to another speed-changing hydraulic pressure control system including a pressure regulating arrangement other than that in the embodiment of the present invention, providing similar advantageous effects to those in the present invention.

The entire contents of Japanese Patent Application No. 2002-285498, filed Sep. 30, 2002, are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A speed-changing hydraulic pressure control system for a belt-type continuously variable transmission including a forward clutch and a torque converter having a lock-up clutch by which an engine is directly connected to the forward clutch, comprising:

an engaging pressure regulating device hydraulically connected to the forward clutch to output an engaging pressure for the forward clutch;

an electronically controlled hydraulic pressure control valve hydraulically connected to the engaging pressure regulating device to output a signal pressure which is able to cause the engaging pressure regulating device to set the engaging pressure for the forward clutch, the electronically controlled hydraulic pressure control valve including a lock-up solenoid valve, wherein the lock-up solenoid valve outputs a signal pressure for controlling an engagement of the lock-up clutch;

a control unit electronically connected to the electronically controlled hydraulic pressure control valve to output a control command signal to the electronically controlled hydraulic pressure control valve, the control command signal causing the electronically controlled hydraulic pressure control valve to output the signal pressure which is able to cause the engaging pressure regulating device to set the engaging pressure for the forward clutch;

a lock-up control valve which outputs an engaging pressure for the lock-up clutch, in accordance with the signal pressure for controlling an engagement of the lock-up clutch of the lock-up solenoid valve; and a change-over device which establishes a communication between the lock-up solenoid valve and the lock-up control valve when the lock-up clutch is engaged, and a communication between the lock-up solenoid valve and the engaging pressure regulating device when the lock-up clutch is released;

wherein the engaging pressure regulating device is arranged to output a minimum value of the engaging pressure for the forward clutch in response to a maximum value of the signal pressure which is able to cause the engaging pressure regulating device to set the engaging pressure for the forward clutch from the electrically controlled hydraulic pressure control valve, and to output a maximum value of the engaging pressure for the forward clutch in response to a minimum value of the signal pressure which is able to cause the engaging pressure regulating device to set the engaging pressure for the forward clutch from the electrically controlled hydraulic pressure control valve.

2. A speed-changing hydraulic pressure control system as claimed in claim 1, wherein the maximum value of the engaging pressure regulating device is set to be less than a transmission-possible torque capacity for a belt of a belt and pulley assembly.

* * * * *